United States Patent

[11] 3,580,981

[72] Inventors Richard W. Lamp
Mendham;
Joseph E. Kopf, Cranford; Donald P. Dravis, Roselle; Robert A. Cuneo, Bergenfield, N.J.

[21] Appl. No. 866,332
[22] Filed Oct. 14, 1969
[45] Patented May 25, 1971
[73] Assignee Technical Wire Products, Inc.
Cranford, N.J.

[54] ELECTRICALLY CONDUCTIVE VENTILATING PANEL
12 Claims, 4 Drawing Figs.

[52] U.S. Cl. .......... 174/35, 29/592
[51] Int. Cl. .......... H05h 9/00
[50] Field of Search .......... 174/35, 35.2, 35.4; 29/624, 592

[56] References Cited
UNITED STATES PATENTS
3,217,085 11/1965 Lindgren .......... 174/35(.4)
FOREIGN PATENTS
768,996 2/1957 Great Britain .......... 174/35(.4)

*Primary Examiner*—Darrell L. Clay
*Attorney*—Littlepage, Quaintance, Wray and Aisenberg

ABSTRACT: A framed electrically conductive honeycomb is provided by assembling an electrically conductive honeycomb, an electrically conductive frame for the honeycomb and an electrically conductive textile positioned between the frame and around the periphery of the outer cells of the honeycomb and in contact with both, and then coating the assembly in a metal plating bath to coat the assembly with a coating of an electrically conductive compound thereby assuring continuous mechanical, strong physical and electrical contact between the frame and the honeycomb, as well as a noncorrosion coating.

Patented May 25, 1971 3,580,981

INVENTORS
RICHARD W. LAMP
JOSEPH E KOPF
ROBERT A. CUNEO
DONALD P. DRAVIS

Littlepage, Quaintance, Wray & Aisenberg
ATTORNEYS

ELECTRICALLY CONDUCTIVE VENTILATING PANEL

SUMMARY OF THE INVENTION

This invention relates to an electrically conductive ventilating panel, especially well adapted for use in connection with apparatus such as electronic equipment needing shielding against the ingress or egress of interferring electromagnetic energy (EMI) or shielding against so-called radio frequency interference (RFI).

It is well know that apparatus which may need shielding against EMI or RFI often needs to be cooled or ventilated. Thus the problem arises of obtaining the desired cooling while preserving as much as possible of the EMI or RFI shielding. Framed electrically conductive honeycomb panels, normally positioned in containers for the apparatus, have been used for this purpose but but their use has left much to be desired both from the point of view of proper functioning and economic fabrication.

Since imparting strength is not a primary function in ventilating panels for sensitive electronic equipment, the honeycomb most effectively used therein is of a very light gauge which may even be designated a foil.

It will be understood that is such ventilating panels are to serve the dual function of ventilating and shielding that the honeycomb and the panel must be electrically conductive and that a strong electrical and mechanical bond must be established between the frame and the honeycomb both of which typically are fabricated from electrically conductive compounds or substances such as various metals or alloys typified by brass, steel, lead coated steel, aluminum and silicone resins loaded with silver. It is advantageous for such compounds or substances to have good thermal conductivity to assist in the dissipation of heat but this is not essential for ventilation is relied upon primarily for the dissipation of heat but it is important that the bond between the frame and the honeycomb possess good electrical conductivity and be rigidly connected in order to facilitate the shielding of the apparatus against EMI or RFI.

It has been found that conventional methods of cutting the honeycomb to fit into the frame and then trying to establish good physical and electrical bonds between the two have left the fabricators with many practical problems. For instance, due to the thin foils typically employed in the manufacture of ferrous and nonferrous honeycombs, the cutting and fitting of the cut honeycomb into a frame is difficult for the following reasons, among others, namely:

a. variances in pitches and cell dimensions in the honeycomb;
b. directions of foil strips creates unsupported foil ends; and
c. alignment and size of cells is irregular.

As a result, good electrical and mechanical bonds have not been obtainable by following conventional procedures of fitting the cut honeycomb into the frame and bonding the two to one another as by resistance welding, brazing, soldering, etc. Either good bonds could not be obtained by using conventional fabricating practices or unnecessarily expensive honeycombs or unconventional procedures were necessary which proved too costly.

Now it has been found that the foregoing and other difficulties have been overcome by assembling a frame of a desired configuration with a honeycomb cut to fit into the frame which is provided with an electrically conductive textile positioned around its periphery and between the frame and the honeycomb, and thereafter coating the assembly with an electrically conductive metal. It has been found that metal textiles have sufficient resilience especially when using several lamina or a braid, to make close tolerances between the dimensions of the honeycomb and the frame unnecessary. This resilience is of importance in mounting the honeycomb within the frame and in maintaining good physical contact both with the periphery of the outer cells of the honeycomb and with the inside of the frame. For instance, a honeycomb can be cut to fit easily into a frame without close tolerances. Slots or grooves can be provided in fins or foil ends normally extending from the closed cells of the cut honeycomb and a knitted or a braided metallic mesh gasket, somewhat shorter than the circumference of the honeycomb, can be stretched to fit snugly into the groove and then have the ends thereof fastened together. The thickness of the gasket can be regulated so that it extends beyond the groove, yet due to the resilience in the metal textile the honeycomb can now be press-fit easily into the metallic frame so that the outer periphery of the gasket is in physical contact with the frame. In another embodiment of the invention the outer periphery of the cut honeycomb can have a sheet or strip of electrically conductive textile wrapped around the honeycomb and the assembly than press-fit into the frame. In still another, but somewhat less economical embodiment, the frame can be provided with a narrow inner flange on which the electrically conductive textile gasket is positioned and the honeycomb then press-fitted into the frame and into contact with the metal gasket.

The thickness of the electrically conductive textile can be controlled easily in fabricating it or by laminating so that good physical contact is obtained with both the frame and the honeycomb before the assembly is coated with the electrically conductive coating.

The invention will be further understood from the drawings illustrating representative embodiments of the invention in which like numerals represent like parts.

Figures 1, 2, 3, 4:
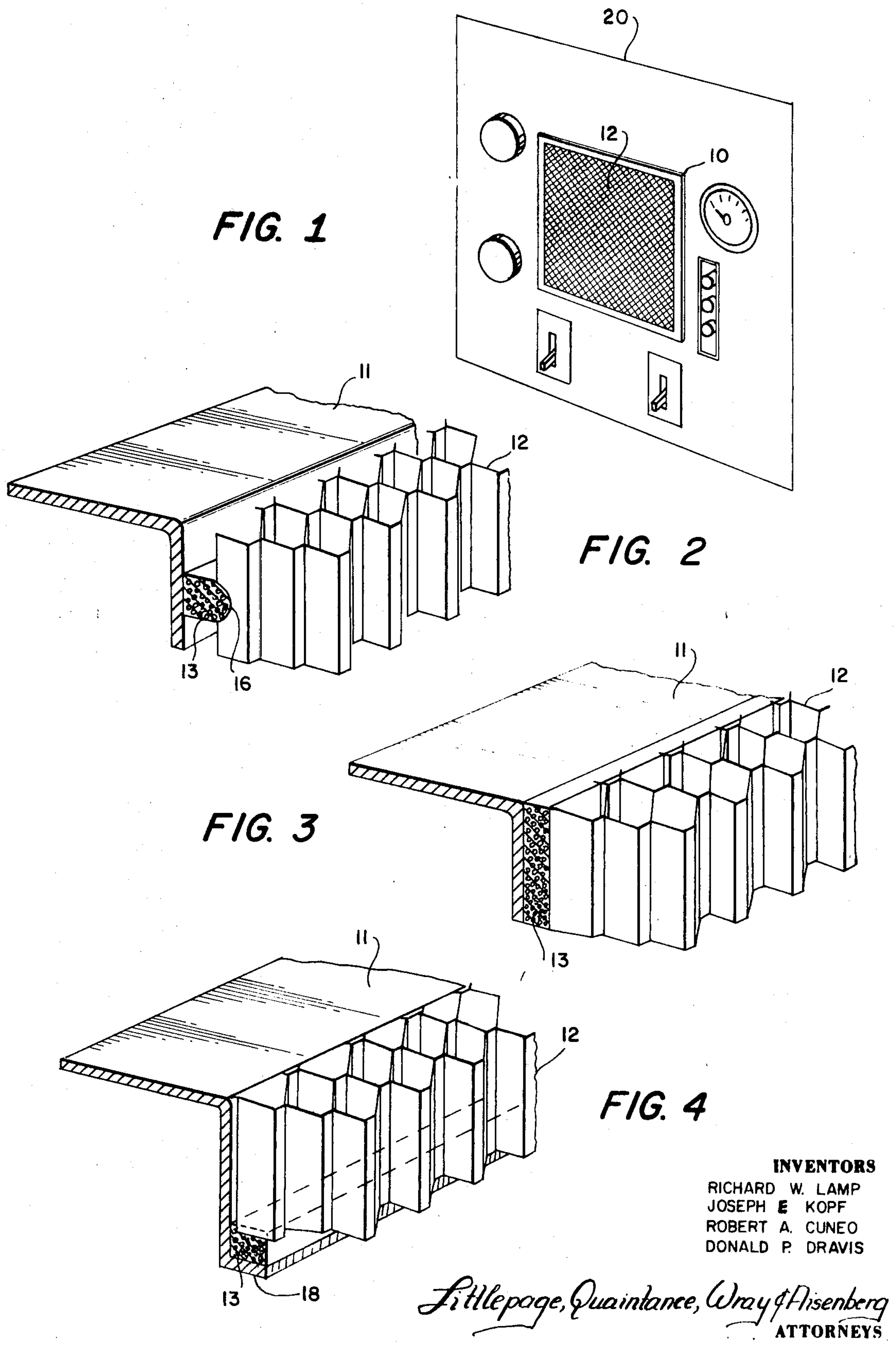
FIG. 1 is perspective front view of a ventilating panel of the type involved in this invention mounted in a cabinet.
FIG. 2 is a fragmentary perspective view of a honeycomb mounted in a frame with a tubular-shaped gasket mounted in a groove and interposed between the honeycomb and the frame and in physical contact with each.
FIG. 3 is another like fragmentary view in which a metal textile sheet, or strip, material is wrapped snugly around the honeycomb and thereby interposed between the honeycomb and the frame and in contact with both.
FIG. 4 is yet another like fragmentary view in which the gasket is mounted on a narrow flange.

Referring to the FIGS. the panel is generally designated 10, the frame 11 and the honeycomb 12. The metal textile positioned around the honeycomb 12 and serving as a gasket is designated 13.

It will be apparent that FIG. 2 illustrates the embodiment first discussed above; FIG. 3 the embodiment discussed secondly, and FIG. 4 the embodiment discussed lastly.

In FIG. 1 a ventilating panel, generally designated 10, is shown mounted in a cabinet 20; for example, for a piece of electronic equipment.

More particularly, as shown in FIG. 2, the gasket 13 is first drawn securely around honeycomb 12 and into groove 16 provided therearound and this assembly is press-fitted into frame 11 to form the assembled ventilating panel 10. Then the assembly is coated with a conductive metal, preferably by dipping or immersing in a molten or liquid metal plating bath, thereby assuring a good mechanical and electrical bond between the frame and the honeycomb. In addition, the electrically conductive textile possess a capillary or wicking action which causes the metal to fully fill the space between the honeycomb and the frame, and to hold the metal there, after the assembly is removed from a molten metal coating bath thereby assuring superior electrical contact and superior mechanical and electrical bonds among the components of the ventilating panel. Electroless or electrolytic metal plating baths can be used in the process of this invention, but they are more expensive and less satisfactory.

In the embodiment illustrated in FIG. 3, the textile sheet 13 is wrapped tautly around the honeycomb 12 and then the panel is assembled and coated as indicated in the discussion of FIG. 2.

In the embodiment illustrated in FIG. 4 the textile 13 is first positioned inside and around frame 11 and on flange 18 and then the honeycomb 12 is press-fitted into frame 11 and into intimate contact with textile 13. Then the assembly was coated in the manner discussed above.

In a particular embodiment of the invention a frame of low carbon steel, suitable for the formation of a ventilating panel, was fitted with a low carbon steel honeycomb provided with a circumscribing low carbon steel wire braid as illustrated in FIG. 2. Then the assembly, in accordance with accepted procedure, was immersed into a so-called tin metal coating bath. The bath consisted of about 50 percent lead and about 50 percent tin and was maintained in a liquid state by maintaining the temperature at i.e. about 450° to 500° F. After the assembly had acquired a temperature sufficient to be fully coated, usually not more than 30 seconds, the assembly was removed and the metal coating allowed to harden. As stated, the metal textile was impregnated and the metal was retained in the mesh during hardening thereby assuring good conductive contact. Also, it was observed that the faces of the cells of the honeycomb were well coated with metal all the way between the top and the bottom of the honeycomb.

In the particular embodiment discussed in the above paragraph, it will be understood that other solders could be used and maintained in the liquid state at their respective melting points.

In this way, very inexpensive components can be used in the panel assembly which is fully protected by the metal coating and, at the same time, a superior electrical and mechanical bond is obtained between the frame and the honeycomb thereby assuring a ventilating panel of superior durability while providing optimum cooling and EMI/RFI shielding.

The term "textile" is used herein in the usual sense to include woven, braided, knitted fabrics or expanded strands of metal although the first three types are used to somewhat greater advantage. Also the term "honeycomb" is used in the conventional sense and is not limited to natural honeycombs which have six sided cells. A honeycomb is an open pore multicellular body with the pores extending from bottom to top and the cells may have many cross-sectional configurations such as triangular, square, diamond shape, etc.

We claim:

1. An electromagnetic shielding and ventilating panel comprising an electrically conductive frame, an electrically conductive honeycomb disposed within said frame, an electrically conductive textile positioned around the periphery of the outer cells of the honeycomb and in contact with said frame and said honeycomb, and an electrically conductive coating covering said frame, honeycomb, and textile thereby providing an electrically conductive electromagnetic shielding and ventilating panel.

2. The panel as defined in claim 1 wherein the textile is positioned intermediate the top and bottom of the honeycomb.

3. The panel as defined in claim 1 wherein the textile is located in proximity to the top or bottom of the honeycomb.

4. The panel as defined in claim 1 wherein all of the components of the assembly are both electrically and thermally conductive.

5. The panel as defined in claim 1 wherein the textile is knitted.

6. The panel as defined in claim 1 wherein the textile is woven.

7. The panel as defined in claim 1 wherein the textile is braided.

8. The panel as defined in claim 1 wherein all the components of the assembly are electrically conductive metallic compounds.

9. A method of producing a framed electrically conductive honeycomb having a strong electrical and mechanical bond between the honeycomb and the frame and possessing superior electrical conductivity which comprises providing an electrically conductive frame of a desired configuration, fitting an electrically conductive honeycomb into said frame, disposing an electrically conductive textile around the periphery of the outer cells of the honeycomb and in contact with said frame and said honeycomb and thereafter coating said assembly with an electrically conductive coating in a coating bath.

10. The method of claim 9 wherein the textile is disposed intermediate the top and the bottom of the honeycomb in grooves provided in said honeycomb.

11. The method of claim 9 wherein the textile is disposed on a narrow inner flange provided in said frame.

12. The process as defined in claim 9 wherein the assembly is coated in a molten metal bath.